(12) United States Patent
Evans et al.

(10) Patent No.: US 11,740,884 B2
(45) Date of Patent: Aug. 29, 2023

(54) MIGRATING A SERVICE TO A VERSION OF AN APPLICATION PROGRAMMING INTERFACE

(71) Applicant: INTERNATIONAL BUSINESS MACHINES CORPORATION, Armonk, NY (US)

(72) Inventors: Jack William Donato Evans, Rochester (GB); Martin A. Ross, Gosport (GB); Luke James Powlett, Henley-in-Arden (GB); Jack Richard William Stevenson, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 87 days.

(21) Appl. No.: 16/575,494

(22) Filed: Sep. 19, 2019

(65) Prior Publication Data

US 2021/0089291 A1 Mar. 25, 2021

(51) Int. Cl.
*G06F 8/65* (2018.01)
*G06F 11/36* (2006.01)
*G06F 9/54* (2006.01)
*G06F 9/445* (2018.01)

(52) U.S. Cl.
CPC ............ *G06F 8/65* (2013.01); *G06F 9/44536* (2013.01); *G06F 9/54* (2013.01); *G06F 11/3612* (2013.01)

(58) Field of Classification Search
CPC .......... G06F 8/65; G06F 9/44536; G06F 9/54; G06F 11/3612
See application file for complete search history.

(56) References Cited

U.S. PATENT DOCUMENTS 9,760,384 B1 * 9/2017 Chauhan ................. G06F 9/541
10,747,505 B1 * 8/2020 Lester ...................... G06F 8/10
(Continued)

OTHER PUBLICATIONS

Lamothe, Maxime, and Weiyi Shang. "Exploring the use of automated api migrating techniques in practice: An experience reporton android." Proceedings of the 15th international conference on mining software repositories. 2018. (Year: 2018).*

(Continued)

*Primary Examiner* — Kevin L Young
*Assistant Examiner* — Joanne G Macasiano
(74) *Attorney, Agent, or Firm* — Jordan T. Schiller (57) ABSTRACT

A method, computer system, and computer program product for migrating a service (e.g. microservice) from using a first application programming interface version to using a second (e.g. newer or updated) application programming interface version. The method may include determining a difference between specifications of the first and second versions of the application programming interface. Historical usage of the first version of the application programming interface by the service may then be analyzed with respect to the difference so as to determine if the service meets the specification of the second version of the application programming interface. Responsive to determining the service meets the specification of the second version of the application programming interface difference, the service may be migrated from using the first version of the application programming interface to using the second version of the application programming interface.

14 Claims, 6 Drawing Sheets

(56) References Cited

U.S. PATENT DOCUMENTS

| | | | |
|---|---|---|---|
| 2015/0143355 A1* | 5/2015 | Tingstrom | G06F 8/65 717/170 |
| 2016/0239546 A1* | 8/2016 | Cuomo | G06F 16/248 |
| 2017/0046146 A1 | 2/2017 | Jamjoom | |
| 2017/0161026 A1* | 6/2017 | Wood | G06F 9/45558 |
| 2017/0337052 A1* | 11/2017 | Elkabany | G06F 8/71 |
| 2018/0176268 A1* | 6/2018 | Malatesha | H04L 67/53 |
| 2019/0018670 A1 | 1/2019 | Ramasamy | |
| 2019/0155597 A1* | 5/2019 | Lander | G06F 8/656 |
| 2019/0179624 A1* | 6/2019 | Agarwal | G06F 40/20 |
| 2020/0259928 A1* | 8/2020 | Bonas | G06F 16/955 |
| 2020/0366759 A1* | 11/2020 | Sinha | H04L 43/062 |
| 2021/0019194 A1* | 1/2021 | Bahl | G06N 20/00 |

OTHER PUBLICATIONS

Li, Wubin, et al. "Service mesh: Challenges, state of the art, and future research opportunities." 2019 IEEE International Conference on Service-Oriented System Engineering (Sose). IEEE, Apr. 2019. (Year: 2019).*

Li, Jun, et al. "How does web service API evolution affect clients?." 2013 IEEE 20th International Conference on Web Services. IEEE, 2013. (Year: 2013).*

Hoover, "With APi's, Change Happens. API Versioning Options to Consider", https://developer.ibm.com/apiconnect/2014/11/06/api-versioning-managing-changes-api/, Published on Nov. 6, 2014 / Updated on Oct. 5, 2016, 5 pages.

Pending U.S. Appl. No. 16/543,757, filed Aug. 19, 2019, entitled: "Optimizing Large Parameter Passing in a Service Mesh", 36 pages.

Sampaio et al., "Improving microservice-based applications with runtime placement adaptation". Journal of Internet Services and Applications, (2019) 10:4, 30 pages.

Mell et al., "The NIST Definition of Cloud Computing", Recommendations of the National Institute of Standards and Technology, Special Publication 800-145, Sep. 2011, 7 pages.

* cited by examiner

MIGRATING A SERVICE TO A VERSION OF AN APPLICATION PROGRAMMING INTERFACE

BACKGROUND

The present invention relates generally to the field of distributed systems, and in particular to a method, system, and computer program for migrating a service from using a first version of an application programming interface (API) to using a second (e.g. newer) version of the API.

It is known to create a distributed system to host software services across a plurality of machines (such as in the cloud), due to the numerous advantages this offers over a traditional on-site deployment. These software services often consist of a plurality of microservices, each of which run in their own containers and communicate with each over (e.g. using REST, and typically HTTP). For example, different microservices may communicate more than others, depending on the architecture of the overall system.

In a large-scale distributed service (or microservice) architecture, the (micro)services are typically developed such that functionality is under version control. By way of example, numerous ways for versioning Application Programming Interfaces (APIs) exposed by (micro)services are known. However, some services can be much slower to migrate from one version of an API to another (e.g. from v1 to v2). As a result, a consumer that utilizes a previous API version (e.g. v1) of a service that has been updated to expose a new API version (e.g. v2) cannot take advantage of the new API version (which may, for example, be better supported and/or contain bug fixes, new functionality and/or improved service level agreements).

BRIEF SUMMARY

The present invention seeks to provide a method for migrating a service from using a first version of an API to using a second version of the API. Such a method may be computer-implemented.

The present invention further seeks to provide a computer program product including computer program code for implementing a proposed method when executed by a processing unit. The present invention also seeks to provide a processing system adapted to execute this computer program code.

The present invention also seeks to provide a system for migrating a service from using a first version of an API to using a second version of the API.

According to an embodiment of the invention, there is provided a computer-implemented method for migrating a service from using a first version of an API to using a second version of the API. The method may include determining a difference between specifications of the first and second versions of the API. The method may also include analyzing historical usage of the first version of the API by the service with respect to the difference to determine if the service meets the specification of the second version of the API. Responsive to determining the service meets the specification of the second version of the API difference, the method may include migrating the service from using the first version of the API to using the second version of the API.

According to another embodiment of the invention, there is provided a computer program product. The computer program product may include a computer readable storage medium having program instructions embodied therewith, the program instructions executable by a processing unit to cause the processing unit to perform a method according to a proposed embodiment.

According to yet another embodiment of the invention, there is provided a system for migrating a service from using a first version of an API to using a second version of the API. The system may include a specification component configured to determine a difference between specifications of the first and second versions of the API. The system may also include an analysis component configured to analyze historical usage of the first version of the API by the service with respect to the difference to determine if the service meets the specification of the second version of the API. The system may further include a migration component configured, responsive to the analysis component determining the service meets the specification of the second version of the API difference, to migrate the service from using the first version of the API to using the second version of the API.

BRIEF DESCRIPTION OF THE DRAWINGS

Preferred embodiments of the present invention will now be described, by way of example only, with reference to the following drawings, in which.

DETAILED DESCRIPTION

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method may be a process for execution by a computer, i.e. may be a computer-implementable method. The various steps of the method may therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

Proposed are embodiments for migrating a service (e.g. microservice) to a second (e.g. newer or updated) API version based on the service's historical usage of a first version of the API. Such concepts may be based on monitoring and tracking API usage to determine if a service can be automatically migrated to a different (e.g. new) version of the API. Embodiments may therefore determine if a service can be migrated to using a new API version, and such determination may be based on analyzing API metrics (such as request history, or access patterns of request/response payloads).

Proposed embodiments may provide for automatic migration of a service to a new/updated API version based on historical API usage by the service. For instance, the historical API usage may be analyzed to determine if the requests/responses from/to the service will meet the requirements of the new/updated API version. In undertaking such analysis, embodiments may only focus on checking requirements that differ between API versions. This may reduce time and/or computational costs associated with completing the analysis.

Embodiments may therefore provide for automatic migration to use the new API version based on breaking changes and usage of API metrics.

By way of example, a proposed embodiment may provide a method for migrating a service from using a first version of an API to using a second version of the API. Such a method may include determining a difference between specifications of the first and second versions of the API. Historical usage of the first version of the API by the service may then be analyzed with respect to the difference so as to determine if the service meets the specification of the second version of the API. Responsive to determining the service meets the specification of the second version of the API difference, the method may then migrate the service from using the first version of the API to using the second version of the API.

In such an embodiment, each specification may comprise a plurality of fields defining respective requirements. The process of determining a difference between the specifications of the first and second versions of the API may then include identifying a first field of both specifications that defines different requirements. Further, determining if the service meets the specification of the second version of the API may then include determining if historical usage of the first version of the API by the service meets the requirement defined by the first field of the specification of the second version of the API.

By way of further example, migrating the service from using the first version of the API to using the second version of the API may include identifying a call from the service to the first version of the API and redirecting the identified call to the second version of the API. For instance, a rule may be defined which is configured to intercept calls to the first version of the API from the service and then direct the intercepted calls to the second version of the API. Such a rule may be simple and cheap to implement.

Some embodiments may further include obtaining historical usage of the first version of the API by the service from a service mesh configured to handle communications between the service and API.

Analyzing historical usage of the first version of the API by the service may include analyzing at least one of: historical requests from the service to the first version of the API; historical responses from the first version of the API to the service; payload access patterns for historical requests from the service; and payload access patterns for historical responses to the service.

Determining a difference between specifications of the first and second versions of the API may include obtaining first and second specifications for the first and second versions of the API, respectively, the first and second specifications each adhering to a standardized framework. The obtained specifications may then be compared to identify a difference between the first and second specifications. By way of example, the standardized framework may include one of Swagger, RAML, APIBlueprint, and Summation. A standard framework for describing the API using a common, easily understandable language may therefore be employed by proposed embodiments.

Some proposed embodiments may further include, responsive to determining the service does not meet the specification of the second version of the API difference, preventing migration of the service from the first version of the API to the second version of the API. In this way, embodiments may automatically prevent migration to the second version so as to prevent errors occurring.

Proposed embodiments may further include monitoring usage of the second version of the API by the service to detect the occurrence of problems. Responsive to detecting the occurrence of problems, the service may be reverted back to using the first version of the API.

When compared to conventional approaches, proposed embodiments may provide one or more of the following advantages: (i) migration to a new API version may be accelerated, enabling an old/previous API to be deprecated sooner; and (ii) maintenance costs may be reduced as a result of faster movement to a new/updated API version.

Figure 1:
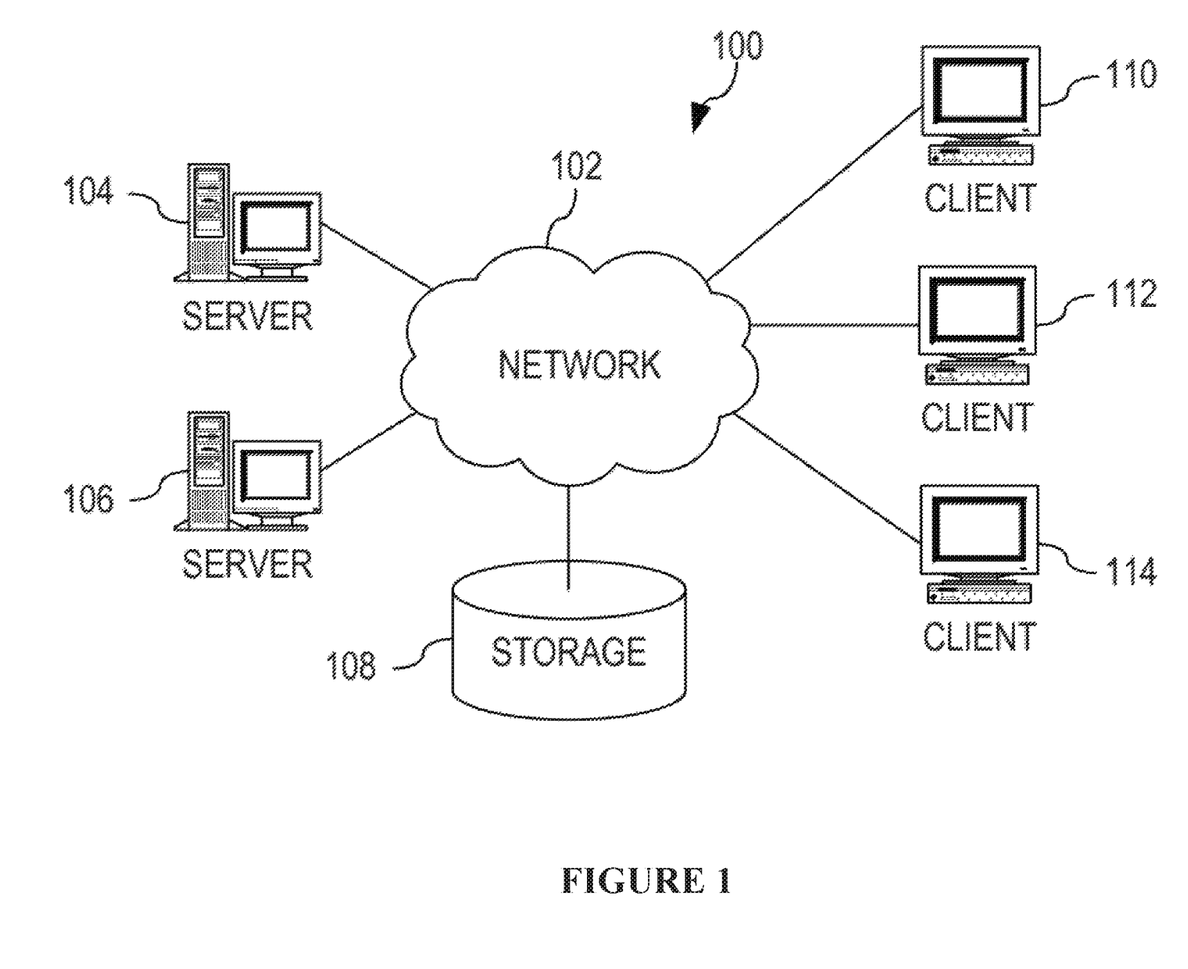
FIG. 1 depicts a pictorial representation of an example distributed system in which aspects of the illustrative embodiments may be implemented.

FIG. 1 depicts a pictorial representation of an exemplary distributed system in which aspects of the illustrative embodiments may be implemented. A distributed system 100 may include a network of computers in which aspects of the illustrative embodiments may be implemented. The distributed system 100 contains at least one network 102, which is the medium used to provide communication links between various devices and computers connected together within the distributed data processing system 100. The network 102 may include connections, such as wire, wireless communication links, or fiber optic cables.

In the depicted example, first server 104 and second server 106 are connected to the network 102 along with a storage unit 108. In addition, clients 110, 112, and 114 are also connected to the network 102. The clients 110, 112, and 114 may be edge devices, for example, personal computers, network computers, IoT devices, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

Figure 2:
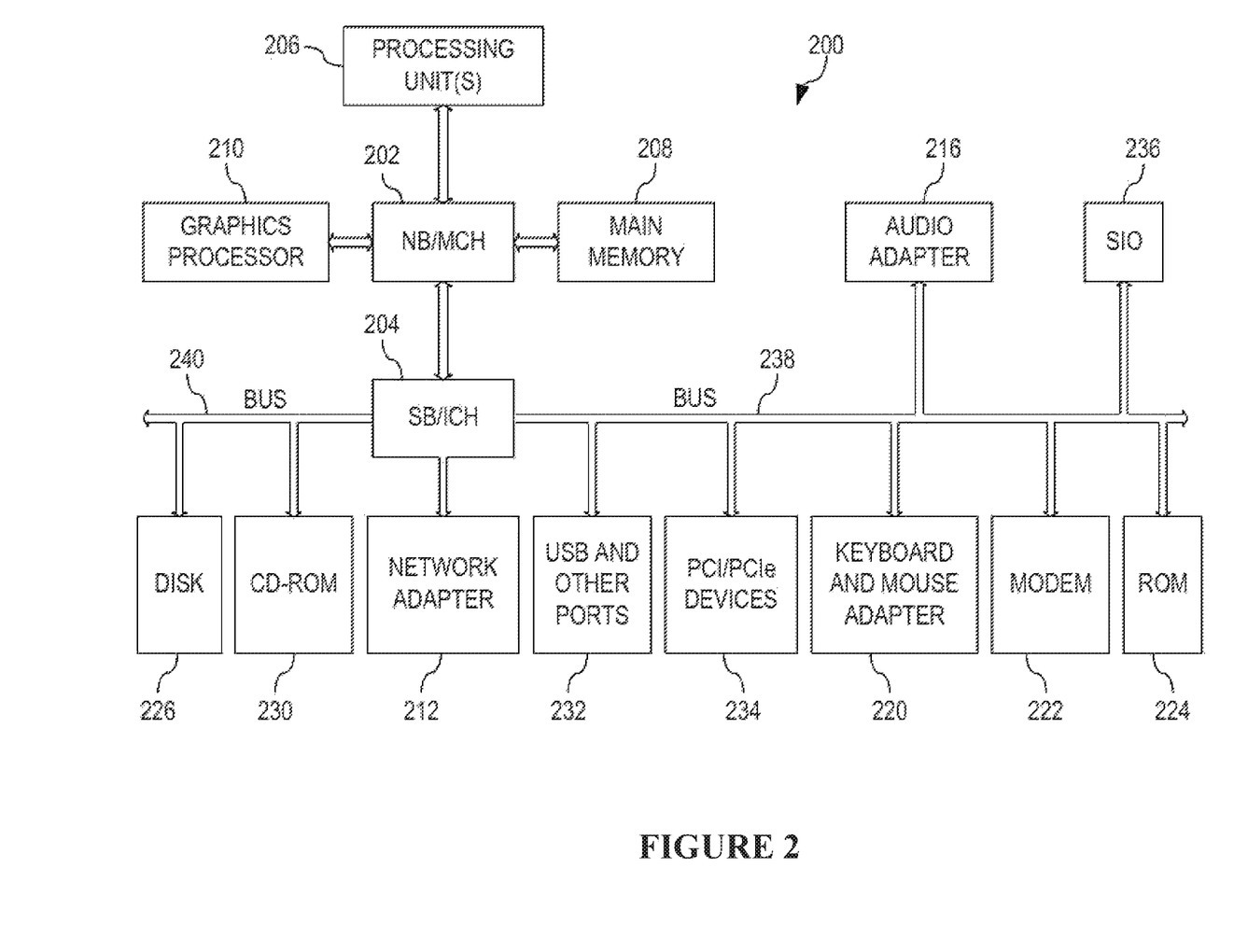
FIG. 2 is a block diagram of an example system in which aspects of the illustrative embodiments may be implemented.

FIG. 2 is a block diagram of an example system 200 in which aspects of the illustrative embodiments may be implemented. The system 200 is an example of a computer, such as client 110 in FIG. 1, in which computer usable code or instructions implementing the processes for illustrative embodiments of the present invention may be located. For instance, a proposed embodiment may be partly implemented in a processing unit 206 of the system 200.

In the depicted example, the system 200 employs a hub architecture including a north bridge and memory controller hub (NB/MCH) 202 and a south bridge and input/output (I/O) controller hub (SB/ICH) 204. Thus, another proposed embodiment may be implemented in the memory controller hub 202 of the system 200. A processing unit 206, a main memory 208, and a graphics processor 210 may be connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) port and other communication ports 232, and PCI/PCIe devices 234 may connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system, such as the Java™ programming system, may run in conjunction with the operating system and provides calls to the operating system from Java™ programs or applications executing on system 200.

As a server, system 200 may be, for example, an IBM® eServer™ System P® computer system, running the Advanced Interactive Executive (AIX®) operating system or the LINUX® operating system. The system 200 may be a symmetric multiprocessor (SMP) system including a plurality of processors in processing unit 206. Alternatively, a single processor system may be employed.

Instructions for the operating system, the programming system, and applications or programs are located on storage devices, such as HDD 226, and may be loaded into main memory 208 for execution by processing unit 206. Similarly, one or more programs according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices 226 and 230.

A bus system, such as first bus 238 or second bus 240 as shown in FIG. 2, may include one or more buses. In addition, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the scope of the present invention.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

As detailed above, proposed embodiments may provide a method and system for Monitoring and tracking API usage and request/response payload access patterns to determine if a service can be auto-migrated to make use of a new/ different version of a target API.

Figure 3:
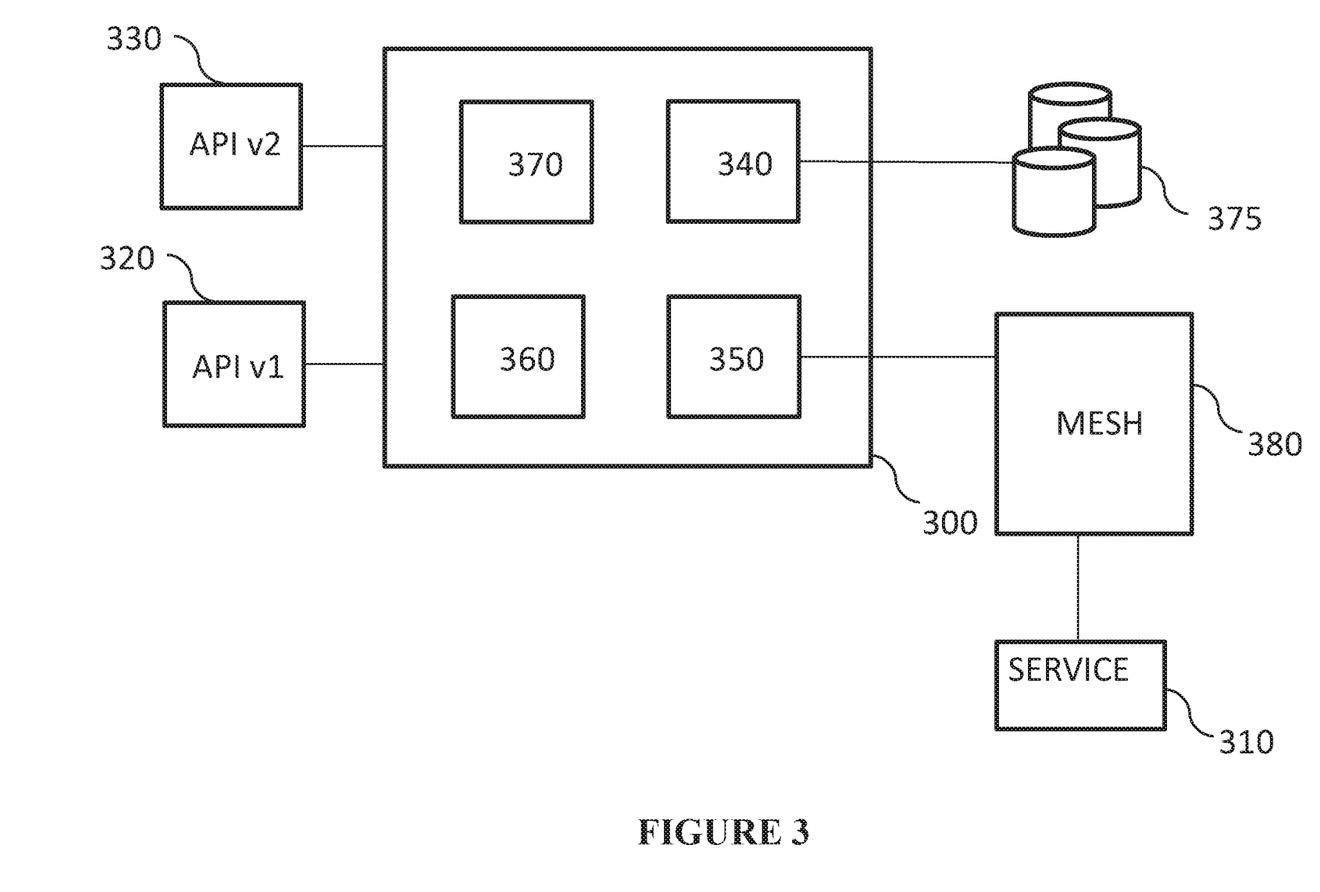
FIG. 3 is a simplified block diagram of proposed system according to an embodiment.

Referring to FIG. 3, there is depicted a schematic diagram of proposed system according to an embodiment. The system 300 is configured to control migration of a service 310 from using a first version of API (i.e. API v1) 320 to using a second version of the API (i.e. API v2) 330.

The system 300 may include a specification component 340 that is configured to determine a difference between specifications of the first version 320 and the second version 330 of the API.

In an embodiment, the specification component 340 is configured to obtain first and second specifications for the first version 320 and the second version 330 of the API, respectively, from a database 375 of API specifications. Here, the first and second specifications each adhere to a standardized framework (such as the widely known frameworks called Swagger, RAML, APIBlueprint, and Summation). The specification component 340 then compares the obtained specifications to identify a difference between the first and second specifications. For instance, where each specification includes a plurality of fields defining respective requirements, the specification component is configured to identify a first field of both specifications that defines different requirements.

The system 300 may also include a mesh interface component 350 that is configured to obtain historical usage of the first version of the API 320 by the service 310. More specifically, in this example, the mesh interface component may be configured to obtain historical usage from a service mesh 380 that handles communications between the service 310 and APIs.

An analysis component 360 of the system 300 may be configured to analyze the obtained historical usage of the first version of the API by the service to determine if the service meets the specification of the second version of the API. This analysis is undertaken with respect to (i.e. focusing on, considering, based on) the difference(s) identified by the specification component 340.

More specifically, in this example (where a first field of both specifications is identified that defines different requirements), the analysis component 360 is configured to determine if historical usage of the first version 320 of the API by the service meets the requirement defined by the first field of the specification of the second version 330 of the API. In analyzing the historical usage, the analysis component analyzes at least one of: historical requests from the service to the first version of the API; historical responses from the first version of the API to the service; payload access patterns for historical requests from the service; and payload access patterns for historical responses to the service.

Responsive to the analysis component determining the service meets the specification of the second version of the API difference, a migration component 370 of the system 300 migrates the service 310 from using the first version 320 of the API to using the second version 330 of the API. More specifically, to undertake such migration, the migration component 370 is configured to identify a call from the service 310 to the first version 320 of the API, and to redirect the identified call to the second version 330 of the API.

Responsive to the analysis component determining the service does not meet the specification of the second version of the API difference, the migration component 370 prevents migration of the service from the first version 320 of the API to the second version 330 of the API.

From the above description of the embodiment of FIG. 3, it will be appreciated that the exemplary embodiment provides for controlled and automatic migration of a service from using a first (e.g. old/previous) API to using a second (e.g. new/updated) version of the API. Such control is based on consideration of the difference(s) between the first and second API versions and whether or not historical service activity indicates that the difference(s) will mean that service activity meets the differing requirement(s) of the second API version.

By way of further example, one may consider an example of a service exposing a first API version "API v1" being updated to provide a second (i.e. new) version of the API "API v2". In such an example, it may be beneficial to migrate users to the second API version API v2 to reduce maintenance costs, etc.

A system according to a proposed embodiment may compare the API interface documents (i.e. specifications) for the first and second API versions to determine the differences that exist between the first and second API versions. If it is determined that the difference involves a change to a request or response, the system may then look at the requests being made to understand if the requests are also valid for the second version of the API v2 API. It then also looks at the access pattern on the responses (e.g. via a Request Parameter Store (RPS) in the service mesh) to understand if the changes in the second API version v2 API will affect that client. If the changes in the second API version v2 API would not, the system determines that the client can be migrated to using the second API version API v2.

As a further example, one may consider an example of a microservice-based application where the specifications (represented using the Swagger format) of first "/v1/test" and second "/v2/test" API versions for Service C are as follows:

```
paths:
/v1/test:
  get:
    parameters:
    name: "data"
    in: "body"
    required: true
    schema:
      type: "object"
      properties:
        id:
          type: integer
          required: true
        name:
          type: string
          required: false
    responses:
    200:
      schema:
        type: "string"
paths:
/v2/test:
  get:
    parameters:
    name: "data"
    in: "body"
    required: true
    schema:
      type: "object"
      properties:
        id:
          type: integer
          required: true
        name:
          type: string
          required: true
    responses:
    200:
      schema:
        type: "string"
```

From comparing the above specifications for the first and second API versions, it is apparent that the second API version changes the "name" field in the request body from being optional to required.

One may then consider using the above specifications for two calling services (A and B) and a third service C that implements the API as follows:

(i) Service A and B both use the /v1/test API (i.e. first API version) on service C;

(ii) Service C is updated to also include a /v2/test API (i.e. second API version);

(iii) When the update is made, a system, according to an embodiment, compares the Swagger descriptions for the first and second API versions to determine the delta/difference between the first and second API versions. Here, the system determines that change is such that the "name" field is now required in the request body for the second API version.

(iv) The system analyses the request history (as observed through the service mesh) from Service A. It is determined that Service A has provided the "name" field on 100% of all requests over the past year.

(v) The system analyses the request history (as observed through the service mesh) from Service B. It is determined that Service B has provided the "name" field in 58% of all requests over the past year.

(vi) The system determines that Service B cannot be migrated to using the second API version (because it does not always provide the "name" field in requests), but also determines that Service A can be migrated to using the second API version without breaking (because it always provides the "name" field in requests).

(vii) The system creates a rule in the service mesh for outbound calls from Service A to the first API version "/v1/test" on Service C to be routed to the second API version "/v2/test" on Service C.

It is noted that monitoring and testing may be employed and rule removed if problems are observed. Once confidence in the redirection of the outbound calls from Service A to the first API version "/v1/test", the entire workload from Service A may be moved to using the second API version "/v2/test".

By way of further example, one may consider an example involving changes in response payloads. In such an example, the specifications (represented using the Swagger format) of first "/v1/test" and second "/v2/test" API versions for Service C are as follows:
paths:
/v1/test:
get:
  parameters:
name: "data"
in: "body"
required: true
schema:
  type: "object"
  properties:
    id:
      type: integer
responses:
200:
  schema:
    type: "object"
    properties:
      status:
        type: "string"
paths:
/v2/test:
  get:
    parameters:
name: "data"
  in: "body"
  required: true
  schema:
    type: "object"
    properties:
      id:
        type: integer
responses:
200:
  schema:
    type: "object"
    properties:
      statusId:
        type: "integer"

From comparing the above specifications for the first and second API versions, it is seen that the second API version changes the status" string field on the response to a "statusId" integer field.

One may then consider using the above specifications for two calling services (A and B) and a third service C that implements the API as follows:

(i) Service A and B both use the /v1/test API (i.e. first API version) on service C;

(ii) Service C is updated to also include a /v2/test API (i.e. second API version);

(iii) When the update is made the system according to an embodiment compares the Swagger descriptions for the first and second API versions to determine the delta/difference between the first and second API versions. Here, the system determines the change is such that the "status" field is now "statusId" and an integer instead of string.

(iv) The system analyses the request history (as observed through the service mesh) from Service A. Here, the data access to response payloads has been tracked through a RPS and shows that the "status" field has been accessed/requested.

(v) The system analyses the request history (as observed through the service mesh) from Service B. Here, the data access to the response payloads has been tracked through the RPS and shows that the body of the response has not been accessed-only the status code of the response.

(vi) The system determines that Service A cannot be migrated, but that Service B can be migrated to using the second API version without breaking.

(vii) The system creates a rule in the service mesh for outbound calls from Service B to the first API version "/v1/test" on Service C to be routed to the second API version "/v2/test" on Service C.

Again, monitoring and testing may be employed and rule removed if problems observed.

Accordingly, from the examples described above, it will be understood that some embodiments may further include a monitor component that is configured to monitor usage of the second version of the API by the service to detect the occurrence of problems. Responsive to detecting the occurrence of problems, the migration component may revert the service back to using the first version of the API.

Once a service has been migrated to using the new API version, this could trigger an issue being opened against a repository to change the service from calling the old API version to calling the new API version. This could include the details of the specification so that a developer can see the changes between the API versions.

In addition, it is likely that the rules set for a control plane are stored in a repository and used during deployment of a production system. Thus, once the monitoring system updates the rules set in the control plane, an issue could be triggered against the repository that holds the information for the rules.

Figure 4:
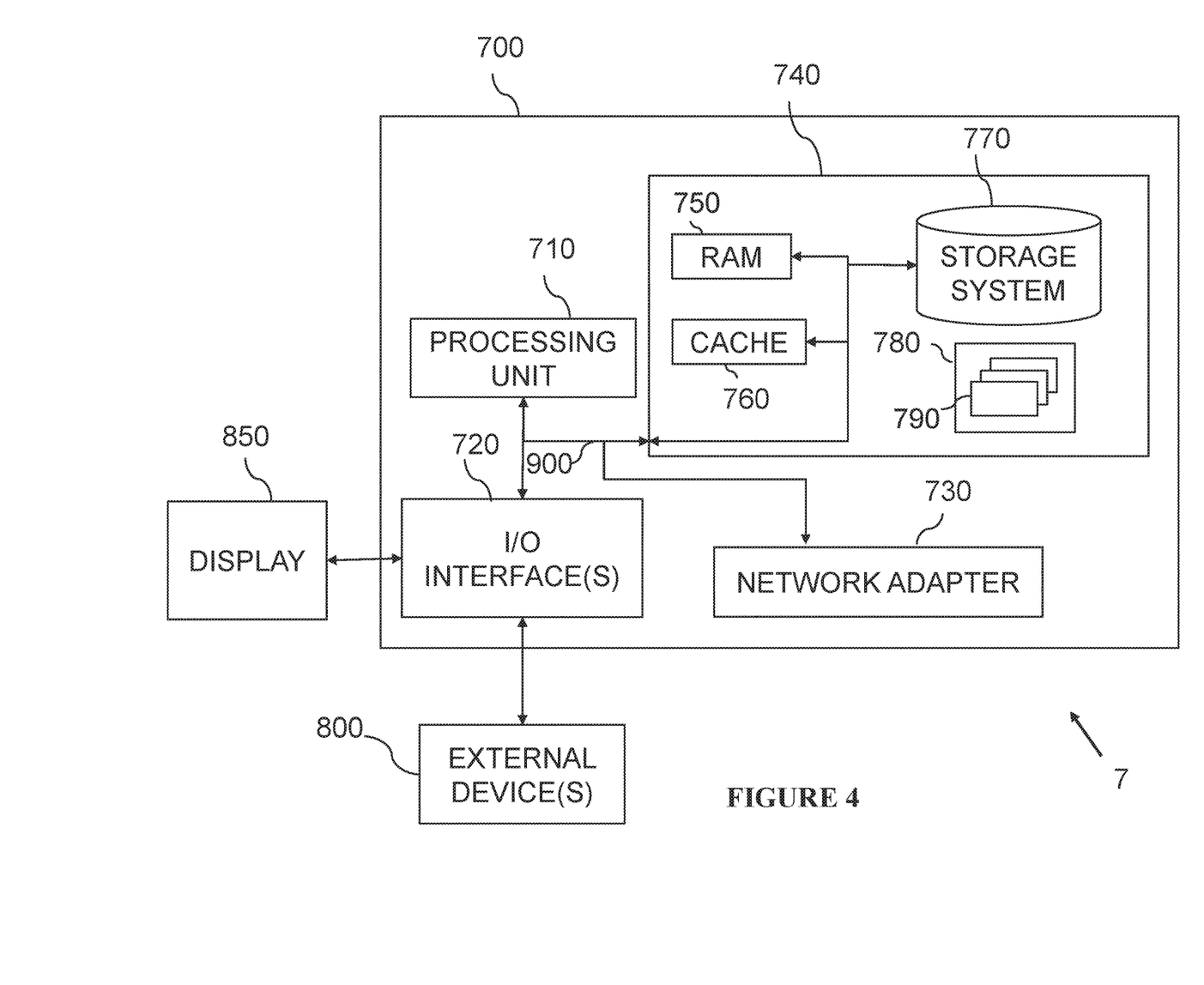
FIG. 4 illustrates a system according to another embodiment.
Figure 5:
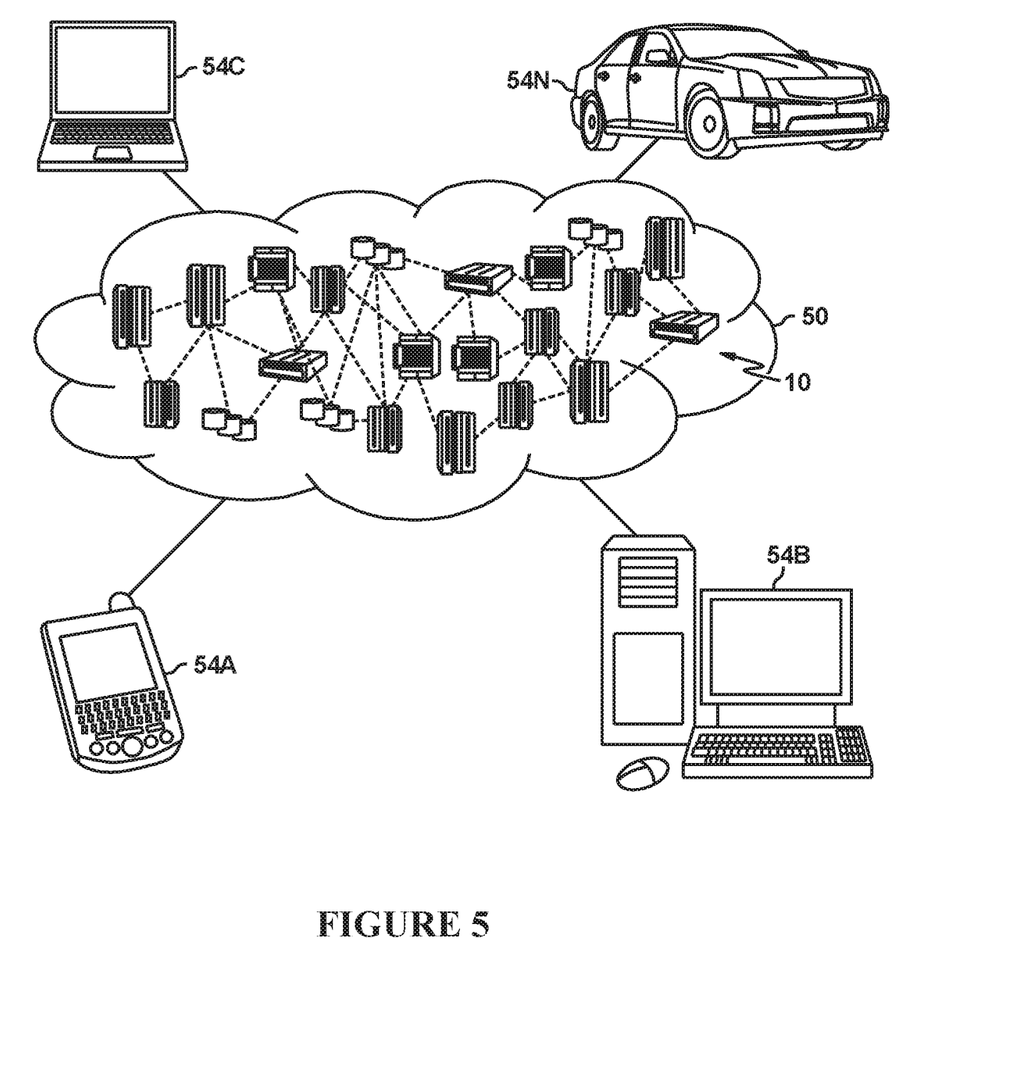
FIG. 5 illustrates a cloud computing environment, in accordance with an embodiment of the invention.
Figure 6:
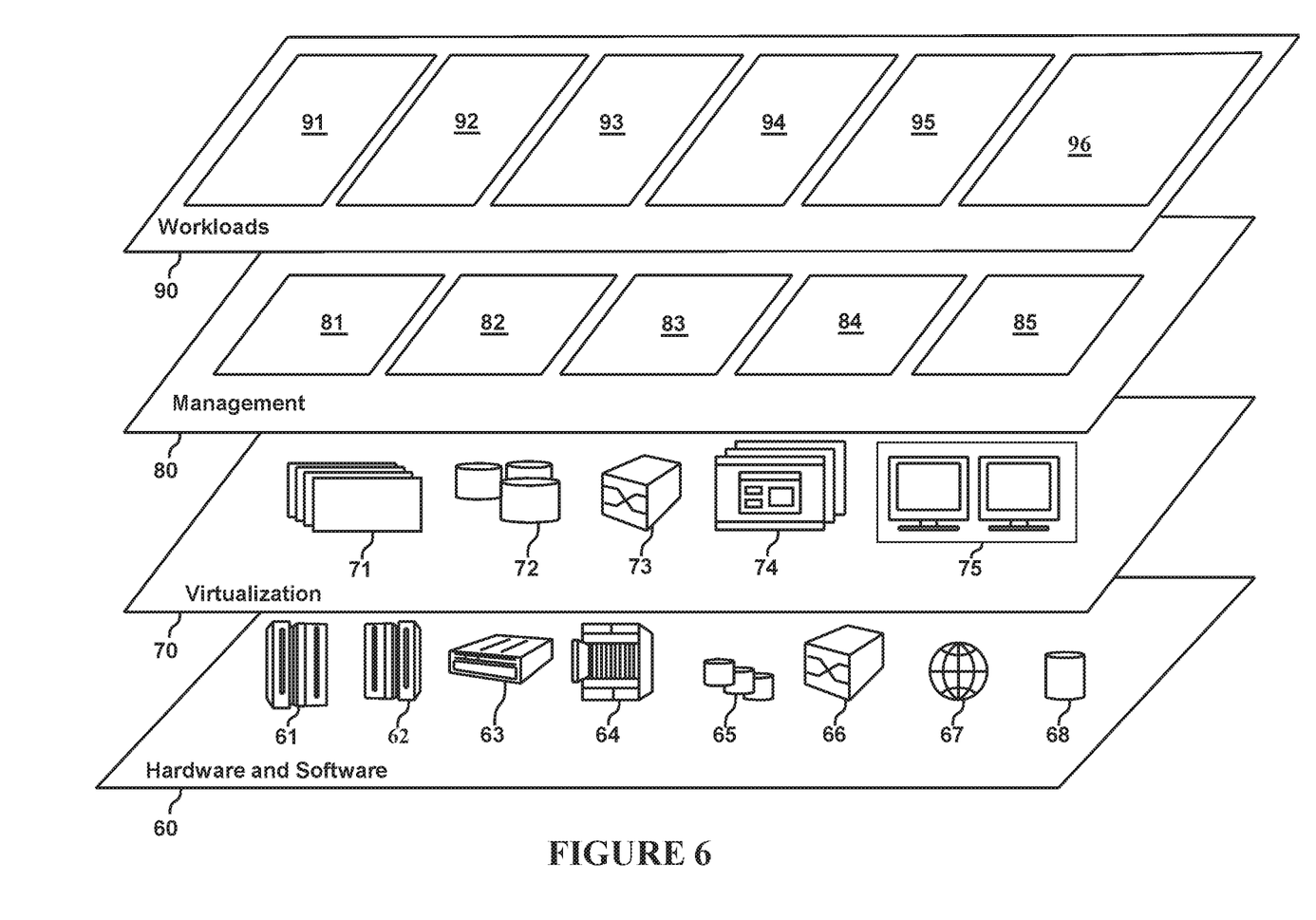
FIG. 6 illustrates a set of functional abstraction layers provided by the cloud computing environment of FIG. 5, in accordance with an embodiment of the invention.

By way of yet further example, embodiments may include a computer system 700, which may form part of a networked system 7 illustrated in FIG. 4. For instance, a migration component configured to migrate the service from the first version of the API to the second version of the API an embodiment may be implemented in the computer system 700 (e.g. as a processing unit 710). The components of computer system/server 700 may include, but are not limited to, one or more processing arrangements, for example comprising processors or processing units 710, a system memory 740, and a bus 900 that couples various system components including system memory 740 to processing unit 710.

System memory 740 may include computer system readable media in the form of volatile memory, such as random access memory (RAM) 750 and/or cache memory 760.

Computer system/server 700 may further include other removable/non-removable, volatile/non-volatile computer system storage media. In such instances, each can be connected to bus 900 by one or more data media interfaces. The memory 740 may include at least one program product having a set (e.g., at least one) of program modules that are configured to carry out the functions of proposed embodiments. For instance, the memory 740 may include a computer program product having program executable by the processing unit 710 to cause the Input/Output (I/O) interface 720 perform a method for according to a proposed embodiment. Program/utility 780, having a set (at least one) of program modules 790, may be stored in memory 740. Program modules 790 generally carry out the functions and/or methodologies of proposed embodiments for migrating a service from a first version of an API to a second version of the API.

Computer system/server 700 may also communicate with one or more external devices 800 such as a keyboard, a pointing device, a display 850, etc.; one or more devices that enable a user to interact with computer system/server 700; and/or any devices (e.g., network card, modem, etc.) that enable computer system/server 700 to communicate with one or more other computing devices. Such communication can occur via Input/Output (I/O) interfaces 720. Still yet, computer system/server 700 can communicate with one or more networks such as a local area network (LAN), a general wide area network (WAN), and/or a public network (e.g., the Internet) via network adapter 730 (e.g. to communicate with a service mesh).

In the context of the present application, where embodiments of the present invention constitute a method, it should be understood that such a method is a process for execution by a computer, i.e. is a computer-implementable method. The steps of the method therefore reflect various parts of a computer program, e.g. parts of one or more algorithms.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data classification 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for migrating a web service from using a first version of an application programming interface (API) to using a second version of the API, the method comprising:

during an execution of the service, identifying a call from the service to the first version of the API and migrating the service to the second version of the API, wherein two versions of the API exist, and based on historical usage of the first version of the API of the service, wherein the migrating further comprises:

determining a difference between specifications of the first version of the API and the second version of the API, wherein each specification comprises a plurality of fields defining respective requirements, wherein determining the difference between the specifications of the first and second versions of the API comprises identifying a first field of both specifications that defines different requirements;

analyzing the historical usage of the first version of the API by the service with respect to the difference to determine if the service meets the specification of the second version of the API, wherein determining if the service meets the specification of the second version of the API comprises determining if the historical usage of the first version of the API by the service meets the requirement defined by the first field of the specification of the second version of the API;

wherein analyzing the historical usage of the first version of the application programming interface by the service comprises analyzing at least one of:
historical requests from the service to the first version of the application programming interface;
historical responses from the first version of the application programming interface to the service;
payload access patterns for the historical requests from the service using a service mesh; and
payload access patterns for the historical responses to the service using the service mesh;

tracking the payload access patterns for the historical requests and the historical responses to determine if a new version of a target API can be auto-migrated;

in response to determining the service meets the specification of the second version of the API difference, migrating the service from using the first version of the API to using the second version of the API; and defining a rule in the service mesh to automatically redirect future calls to the service to the second version of the API.

2. The method of claim 1, wherein migrating the service from using the first version of the application programming interface to using the second version of the application programming interface comprises:
  identifying the call from the service to the first version of the application programming interface; and
  redirecting the identified call to the second version of the application programming interface.

3. The method of claim 1, further comprising:
  obtaining the historical usage of the first version of the application programming interface by the service from the service mesh configured to handle communications between the service and the application programming interface.

4. The method of claim 1, wherein determining the difference between the specifications of the first and second versions of the application programming interface comprises:
  obtaining first and second specifications for the first and second versions of the application programming interface, respectively, the first and second specifications each adhering to a standardized framework; and
  comparing the obtained specifications to identify a difference between the first and second specifications.

5. The method of claim 1, further comprising:
  in response to determining the service does not meet the specification of the second version of the application programming interface difference, preventing migration of the service from the first version of the application programming interface to the second version of the application programming interface.

6. The method of claim 1, further comprising:
  monitoring usage of the second version of the application programming interface by the service to detect occurrence of problems;
  in response to detecting the occurrence of problems, reverting the service back to using the first version of the application programming interface.

7. The method of claim 1, further comprising:
  during the execution of the service, identifying the call from the service to the first version of the API and automatically redirecting the identified call to the second version of the API, wherein two versions of the API exist, based on the rule in the service mesh.

8. A computer program product comprising a computer readable storage medium having program instructions embodied therewith, the program instructions executable by a processing unit to cause the processing unit to perform, when run on a computer network, a method for migrating a web service from using a first version of an application programming interface (API) to using a second version of the API, the method, comprising the steps of:
  during an execution of the service, identifying a call from the service to the first version of the API and migrating the service to the second version of the API, wherein two versions of the API exist, and based on historical usage of the first version of the API of the service, wherein the migrating further comprises:
    determining a difference between specifications of the first version of the API and the second version of the API, wherein each specification comprises a plurality of fields defining respective requirements, wherein determining the difference between the specifications of the first and second versions of the API comprises identifying a first field of both specifications that defines different requirements;
    analyzing the historical usage of the first version of the API by the service with respect to the difference to determine if the service meets the specification of the second version of the API, wherein determining if the service meets the specification of the second version of the API comprises determining if the historical usage of the first version of the API by the service meets the requirement defined by the first field of the specification of the second version of the API;
    wherein analyzing the historical usage of the first version of the application programming interface by the service comprises analyzing at least one of:
      historical requests from the service to the first version of the application programming interface;
      historical responses from the first version of the application programming interface to the service;
      payload access patterns for the historical requests from the service using a service mesh; and
      payload access patterns for the historical responses to the service using the service mesh;
    tracking the payload access patterns for the historical requests and the historical responses to determine if a new version of a target API can be auto-migrated;
    in response to determining the service meets the specification of the second version of the API difference, migrating the service from using the first version of the API to using the second version of the API; and
    defining a rule in the service mesh to automatically redirect future calls to the service to the second version of the API.

9. A system for migrating a web service from using a first version of an application programming interface (API), to using a second version of the application programming interface, the system comprising:
  a computer system comprising, a processor, a computer readable storage medium, and program instructions stored on the computer readable storage medium being executable by the processor to cause the computer system to:
    during an execution of the service, identifying a call from the service to the first version of the API and migrating the service to the second version of the API, wherein two versions of the API exist, and based on historical usage of the first version of the API of the service, wherein the migrating further comprises:
      determining a difference between specifications of the first version of the API and the second version of the API, wherein each specification comprises a plurality of fields defining respective requirements, wherein determining the difference between the specifications of the first and second versions of the API comprises identifying a first field of both specifications that defines different requirements;
      analyzing the historical usage of the first version of the API by the service with respect to the difference to determine if the service meets the specification of the second version of the API, wherein determining if the service meets the specification of the second version of the API comprises determining if the historical usage of the first version of the API by the service meets the requirement defined by the first field of the specification of the second version of the API;
      wherein analyzing the historical usage of the first version of the application programming interface by the service comprises analyzing at least one of:

historical requests from the service to the first version of the application programming interface;
historical responses from the first version of the application programming interface to the service;
payload access patterns for the historical requests from the service using a service mesh; and
payload access patterns for the historical responses to the service using the service mesh;
tracking the payload access patterns for the historical requests and the historical responses to determine if a new version of a target API can be auto-migrated;
in response to determining the service meets the specification of the second version of the API difference, migrating the service from using the first version of the API to using the second version of the API; and
defining a rule in the service mesh to automatically redirect future calls to the service to the second version of the API.

10. The system of claim 9, wherein migrating the service from using the first version of the application programming interface to using the second version of the application programming interface comprises:
identifying the call from the service to the first version of the application programming interface; and
redirecting the identified call to the second version of the application programming interface.

11. The system of claim 9, further comprising:
obtaining the historical usage of the first version of the application programming interface by the service from the service mesh configured to handle communications between the service and the application programming interface.

12. The system of claim 9, wherein determining the difference between the specifications of the first and second versions of the application programming interface comprises:
obtaining first and second specifications for the first and second versions of the application programming interface, respectively, the first and second specifications each adhering to a standardized framework; and
comparing the obtained specifications to identify a difference between the first and second specifications.

13. The system of claim 9, further comprising: in response to determining the service does not meet the specification of the second version of the application programming interface difference, preventing migration of the service from the first version of the application programming interface to the second version of the application programming interface.

14. The system of claim 9, further comprising:
monitoring usage of the second version of the application programming interface by the service to detect an occurrence of problems, and wherein in response to detecting the occurrence of problems, reverting the service back to the first version of the application programming interface.

* * * * *